United States Patent
Forster et al.

(10) Patent No.: US 8,916,020 B2
(45) Date of Patent: Dec. 23, 2014

(54) ASSEMBLY BONDED TO A STRUCTURAL ADHESIVE AND METHOD AND APPLICATOR FOR MAKING IT

(75) Inventors: Jan D. Forster, Aachen (DE); Dirk Hasenberg, Raeren (BE); Siegfried R. Goeb, Willich (DE); Christopher J. Campbell, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 610 days.

(21) Appl. No.: 12/745,987

(22) PCT Filed: Nov. 26, 2008

(86) PCT No.: PCT/US2008/084797
§ 371 (c)(1),
(2), (4) Date: Jul. 16, 2010

(87) PCT Pub. No.: WO2009/076070
PCT Pub. Date: Jun. 18, 2009

(65) Prior Publication Data
US 2010/0294427 A1 Nov. 25, 2010

Related U.S. Application Data

(60) Provisional application No. 60/992,424, filed on Dec. 5, 2007.

(51) Int. Cl.
| | | |
|---|---|---|
| *B08B 3/04* | (2006.01) | |
| *B32B 27/38* | (2006.01) | |
| *C09J 5/02* | (2006.01) | |
| *B32B 7/12* | (2006.01) | |
| *C09J 163/00* | (2006.01) | |
| *C08L 25/10* | (2006.01) | |
| *C08L 59/00* | (2006.01) | |

(52) U.S. Cl.
CPC ... *C09J 5/02* (2013.01); *B32B 7/12* (2013.01); *C09J 163/00* (2013.01); *C08L 25/10* (2013.01); *C08L 59/00* (2013.01); *C09J 2400/163* (2013.01); *C09J 2400/166* (2013.01)

USPC ........... 156/314; 156/281; 156/330; 427/327; 148/537

(58) Field of Classification Search
CPC .......... C23G 5/024; B32B 27/38; B08B 3/04; B08B 3/08
USPC ...................... 156/281, 314–319, 307.3, 330; 427/327; 148/537, 527–536, 25, 28, 148/29, 246, 248
See application file for complete search history.

(56) References Cited

U.S. PATENT DOCUMENTS 3,875,095 A * 4/1975 Yamada et al. ............... 524/499
3,957,406 A 5/1976 Battersby
(Continued)

FOREIGN PATENT DOCUMENTS

DE 2542500 4/1977
DE 2929224 2/1981
(Continued)

OTHER PUBLICATIONS

Dictionary of Food Science and Technology, 2009, Wiley-Blackwell, Second Edition, p. 386.*

(Continued)

*Primary Examiner* — John Goff
*Assistant Examiner* — Scott W Dodds
(74) *Attorney, Agent, or Firm* — Jean A. Lown

(57) ABSTRACT

The invention provides an assembly comprising at least one substrate being bonded to a structural adhesive wherein the structural adhesive is obtained by curing a precursor comprising a cross-linkable polymer, wherein a surface area of the substrate bonded to the structural adhesive comprises at least one metal, said surface area being treated with a liquid activator.

13 Claims, 3 Drawing Sheets

(56) References Cited

U.S. PATENT DOCUMENTS

| | | | |
|---|---|---|---|
| 4,206,004 A * | 6/1980 | Ohashi et al. | 148/537 |
| 4,313,876 A | 2/1982 | Gras | |
| 4,500,606 A * | 2/1985 | Rabito et al. | 428/480 |
| 4,504,647 A | 3/1985 | Zabel | |
| 4,511,488 A * | 4/1985 | Matta | 510/421 |
| 4,908,273 A * | 3/1990 | Urech et al. | 428/413 |
| 4,979,993 A * | 12/1990 | Okamoto et al. | 106/287.3 |
| 5,059,701 A | 10/1991 | Keipert | |
| 5,089,536 A | 2/1992 | Palazzotto | |
| 5,128,423 A | 7/1992 | Parrinello | |
| 5,393,826 A * | 2/1995 | Huver et al. | 524/722 |
| 5,445,680 A | 8/1995 | Hamilton | 134/26 |
| 5,607,512 A * | 3/1997 | Grout | 134/6 |
| 6,180,199 B1 | 1/2001 | Herring, Jr. | |
| 6,187,388 B1 | 2/2001 | Popoola | |
| 6,255,408 B1 | 7/2001 | Shalaby | |
| 6,372,842 B1 | 4/2002 | Grisso | |
| 6,455,622 B1 * | 9/2002 | Winterowd et al. | 524/405 |
| 6,486,256 B1 | 11/2002 | Tarbutton | |
| 6,488,805 B1 * | 12/2002 | Sauer | 156/272.8 |
| 6,849,589 B2 | 2/2005 | Liu | |
| 7,842,739 B2 | 11/2010 | Bruckbauer | |
| 2004/0229990 A1 | 11/2004 | Righettini | |
| 2006/0093568 A1 | 5/2006 | Blin | |
| 2007/0187647 A1 | 8/2007 | Bruckbauer | |

FOREIGN PATENT DOCUMENTS

| | | |
|---|---|---|
| DE | 2946085 | 5/1981 |
| DE | 3019356 | 11/1981 |
| DE | 10110837 | 9/2002 |
| EP | 0109851 | 5/1984 |
| EP | 1361255 | 11/2003 |
| EP | 1439243 | 7/2004 |
| GB | 1539777 | 2/1979 |
| GB | 2405639 | 3/2005 |
| WO | WO 94/00527 | 1/1994 |
| WO | WO 02/34855 | 5/2002 |
| WO | WO 2006/028806 | 3/2006 |
| WO | WO 2008/089410 | 7/2008 |

OTHER PUBLICATIONS

STIC search received on Apr. 29, 2014, 29 pages.*
3M Citrus Base Cleaner (Aerosol), Technical Data, Oct. 2004, 2 pgs. (XP-002517510).
Davis, "Thermocapillary Instabilities", Annual Review of Fluid Mechanics, Jan. 1987, vol. 19, pp. 403-435.
Fanton, "Spreading and Instabilities Induced by a Solutal Marangoni Effect", Langmuir, Apr. 28, 1998, vol. 14, No. 9, pp. 2554-2561.
Hansen, "Surface Tension by Pendant Drop. I. A Fast Standard Instrument Using Computer Image Analysis", Journal of Colloid & Interface Science, Jan. 1991, vol. 141, No. 1 pp. 1-9.
Marangoni, "Ueber die Ausbreitung der Tropfen einer Flüssigkeit auf der Oberfläche einer anderen", Annalen der Physik Und Chemie, Band CXLIII, 1871, vol. 219, Issue 7, pp. 337-354.
Van Krevelen, Properties of Polymers: Their Correlation with Chemical Structure; Their Numerical Estimation and Prediction from Additive Group Contributions, 3rd Ed., 1990, Elsevier, pp. 200-225.
International Search Report for PCT/US2008/084797, 6 pgs.

* cited by examiner

ASSEMBLY BONDED TO A STRUCTURAL ADHESIVE AND METHOD AND APPLICATOR FOR MAKING IT

CROSS REFERENCE TO RELATED APPLICATIONS

This application is a national stage filing under 35 U.S.C. 371 of PCT/US2008/084797, filed Nov. 26, 2008, which claims priority to Provisional Application No. 60/992,424, filed Dec. 5, 2007, the disclosure of which is incorporated by reference in its/their entirety herein.

FIELD OF THE INVENTION

The present invention relates to an assembly comprising at least one substrate having a metal surface area being bonded to a structural adhesive and, in particular, to an assembly comprising at least two substrates sandwiching the structural adhesive. The present invention furthermore refers to a method and an applicator device for making such assemblies.

BACKGROUND OF THE INVENTION

Above and below the term structural adhesive refers to adhesives the precursor of which comprises a cross-linkable polymer. Depending on the nature of the cross-linkable groups the precursor may be curable to a cross-linked structural adhesive by exposing it to heat and/or actinic radiation, or it may be curable by exposure to ambient moisture. In case the precursor is heat and/or radiation curable the precursor further comprises an effective amount of a curing system. The curing system comprises one or more compounds selected from a group comprising heat-activatable compounds, and radiation-activatable curing agents.

Structural adhesives generally exhibit good adhesion properties to many surfaces and a high bond strength. They have therefore been used to replace or augment conventional joining techniques such as welding or employing mechanical fasteners such as nuts and bolts, screws, rivets etc.

It has, however, been difficult to provide a sufficient adhesion of structural adhesives to metal surfaces which are contaminated with hydrocarbon-containing material such as mineral oils, processing aids such as deep-drawing agents, lubricating agents such as dry lubes, grease, soil and the like.

It is well-known that removing hydrocarbon-containing material from surfaces can be extremely difficult. Mechanical processes such as dry wiping and/or the use of pressurized air tend to leave a thin layer of the hydrocarbon-containing material on the metal surface. Liquid cleaning compositions like that disclosed in U.S. Pat. No. 6,849,589 can be effective but may be less desirable from a processing point of view because the cleaning liquid must be collected and recycled or discarded. In addition to that a drying period is usually required after the cleaning step.

WO 2006/028,806 which discloses an encapsulated cure system for curable compositions mentions that the adhesive strength of such composition on oily metal sheets may be improved by the inclusion of liposoluble additives such as limonene, dipentene, terpene resins or oil of turpentine in an amount of 1-10 wt. % relative to the weight of the curable composition. It was found, however, that the addition of liposoluble additives to the precursor of structural adhesives does not tend to improve the adhesion of the cured structural adhesive to metal surfaces contaminated with hydrocarbon-containing soils to a practically relevant and/or desirable extent. Increasing the amount of the liposoluble additives tends to decrease overall adhesive properties.

It is therefore an object of the present invention to provide a high bonding strength assembly comprising at least one substrate having a metal surface area being bonded to a structural adhesive whereby said surface area may be contaminated with hydrocarbon-containing material. It is another object of the present invention to provide a high bonding strength assembly comprising two substrates sandwiching a structural adhesive wherein at least one substrate comprises a metal surface area bonded to the structural adhesive which may be contaminated with hydrocarbon-containing material. It is particularly preferred that such assembly exhibits a high average peel force and a cohesive failure mechanism. It is another object of the present invention to provide a method for manufacturing such assembly which comprises a step of treating the optionally contaminated designated metal surface area whereby such method is environmentally friendly, cost effective and can be integrated into the industrial process of automotive body production. It is another object of the present invention to provide a process for manufacturing said assembly where the precursor of the structural adhesive can be applied directly and without any waiting time after the surface treatment of the metal surface. It is another object of the present invention to provide an applicator device which is suitable for carrying out such process and which allows, in particular, for a contact-free treatment of the metal surface contaminated with hydrocarbon-containing material. Other objects of the present invention can be readily taken by the person skilled in the art from the following detailed specification.

BRIEF DESCRIPTION OF THE INVENTION

The present invention relates to an assembly comprising at least one substrate being bonded to a structural adhesive wherein the structural adhesive is obtained by curing a precursor comprising a cross-linkable polymer, wherein a surface area of the substrate bonded to the structural adhesive comprises at least one metal and wherein said surface area is treated with a liquid activator. In case the precursor is heat and/or radiation curable it comprises an effective amount of a heat- and/or radiation-activatable curing system.

The present invention furthermore refers to an assembly comprising at least two substrates which are bonded by and sandwich the structural adhesive. In the assembly of the present invention the metal surface area of the substrate to be bonded to structural adhesive may be contaminated with a hydrocarbon-containing material.

The present invention furthermore relates to an assembly comprising at least one substrate having an exposed surface with a designated surface area to be bonded to a structural adhesive wherein said surface area comprises at least one metal, said assembly being obtainable by a method comprising the steps of (i) applying a liquid activator to said surface area of the substrate, and (ii) applying a precursor of said structural adhesive comprising a cross-linkable polymer and an effective amount of a curing system, to the treated surface area of the substrate.

The designated metal surface area of the substrate to be bonded to the structural adhesive may be contaminated with a hydrocarbon-containing material. In case the assembly comprises only one substrate the precursor applied in step (ii) is preferably cured.

In case the assembly comprises two substrates, such assembly is obtainable by a method comprising steps (i)-(ii) above and additionally the further steps of (iii) optionally treating the surface of the second substrate to be bonded to the structural adhesive, with a liquid activator, (iv) attaching the second substrate to the precursor, and (v) curing the precursor.

The present invention furthermore relates to a method of preparing an assembly comprising at least one substrate having an exposed surface with a designated surface area to be bonded to a structural adhesive wherein said surface area comprises at least one metal, the method comprising the steps of (i) applying a liquid activator continuously or discontinuously to said surface area of the substrate, and (ii) applying a precursor of the structural adhesive to the surface area of the substrate treated with the liquid activator.

The present invention furthermore relates to a method of preparing an assembly comprising two substrates being bonded by a structural adhesive, said method comprises the above steps (i) and (ii) and additionally the further steps of (iii) optionally treating continuously or discontinuously the surface area of the second substrate to be bonded to the structural adhesive, with a liquid activator, (iv) attaching the second substrate to the adhesive, and (v) curing the precursor.

The invention furthermore relates to an applicator device for providing an assembly comprising at least one substrate being bonded to a structural adhesive wherein the structural adhesive is obtained by curing a precursor comprising a cross-linkable polymer, wherein a surface area of the substrate bonded to the structural adhesive comprises at least one metal, and wherein said surface area is being treated continuously or discontinuously with a liquid activator, said applicator device being movable relative to said surface area of the at least one substrate, and comprising a first application unit for applying continuously or discontinuously the liquid activator and a second application unit for applying continuously or discontinuously the precursor of the adhesive to the designated surface area of said substrate, the second application unit being arranged behind the first application unit relative to the direction of movement of the applicator device so that the liquid activator is applied first to the surface with the precursor of the adhesive being applied onto the activator.

SHORT DESCRIPTION OF THE FIGURES

DETAILED DESCRIPTION OF THE INVENTION

The assembly of the present invention comprises at least one substrate having a designated surface area to be bonded to a structural adhesive whereby such designated surface area or bonding area comprises one or more metals. The substrate does not need to be composed of one or more metals only but it can also be a substrate comprising polymer, wood, concrete, glass or other materials with the exposed designated surface area of such substrate to be bonded to the adhesive being covered by a metal sheet or coated with a metal layer. The surface of the substrate facing the adhesive may only partly be a metal surface and partly comprise other materials. The term "metal" is used in its broadest sense and comprises, for example, iron, copper, aluminium and/or zinc and alloys such as steel, brass or duralumin. This enumeration is purely exemplary and by no means limiting.

In industrial processes metal surfaces are frequently treated with hydrocarbon-containing processing and handling agents such as mineral oils, lubricating agents, greases, dry lubes, deep draw agents, corrosion protection agents and the like. The metal surfaces may be contaminated by a wide range of other oily or greasy materials including food greases such as lard and vegetable oils. These materials are collectively referred to above and below as hydrocarbon-containing materials.

It was found by the present inventors that the bonding between a metal surface contaminated with hydrocarbon-containing material and a structural adhesive applied to such surface can be improved if the contaminated metal surface is treated prior to the application of the adhesive by a liquid activator comprising one or more compounds which are capable of displacing hydrocarbon-containing material.

Figure 1A:
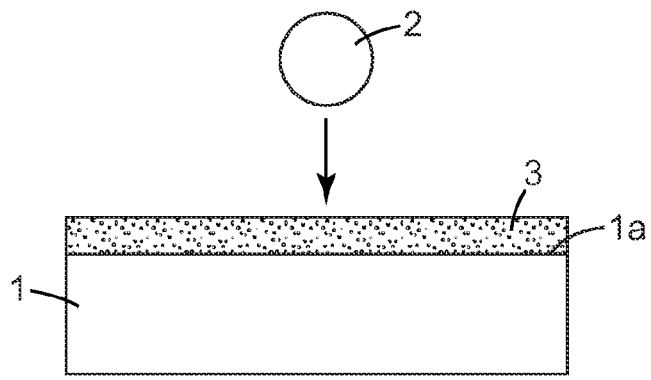
FIG. 1 shows a schematic representation of the displacement of part of a hydrocarbon-containing material layer on a metal surface by a droplet of a liquid activator component.

The displacing effect of a liquid activator on a layer of a hydrocarbon-containing material on a metal surface is schematically illustrated FIGS. 1a-1d. In FIG. 1a, a droplet of the liquid activator 2 is falling towards or gently placed on, respectively, the layer of the hydrocarbon-containing material 3 on the metal surface 1a. The graphical representation of FIG. 1a is highly schematic and shows, for example, an ideal droplet of the liquid activator 2, an ideally smooth metal surface 1a and a continuous surface film of the hydrocarbon-containing material 3 having a homogenous thickness. This representation is meant to be illustrative and by no means limiting. The surface contamination comprising a hydrocarbon containing material 3, may form a continuous or discontinuous film whereby the thickness of such film or its extension in a direction normal to the width may vary widely on the metal surface. The surface contamination may comprise other contaminating agents in addition to the hydrocarbon-containing material.

Figure 1B:
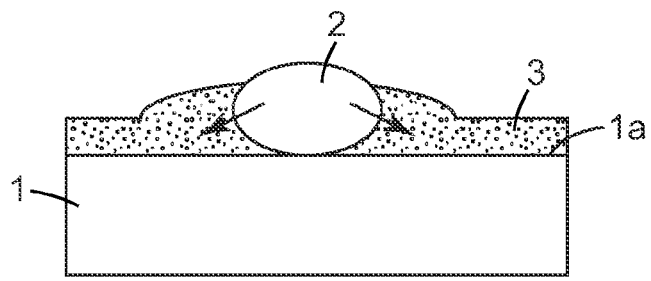
Figure 1C:
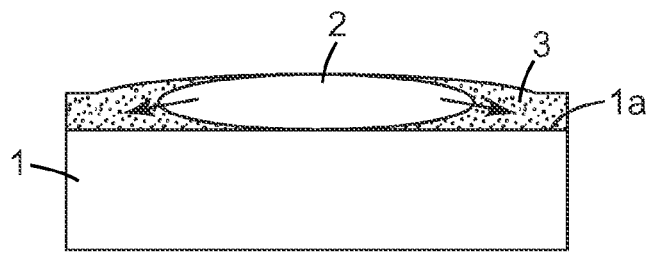

In FIG. 1b the droplet of the liquid agent 2 impinges onto or is gently placed on, respectively, the layer of the hydrocarbon containing material 3. If the liquid activator 2 is capable of displacing the specific hydrocarbon-containing material present on the surface 1a it will push the surface contamination locally aside as is schematically shown in FIG. 1c. The hydrocarbon-containing material is at least partially removed from the impact area as is schematically shown in FIG. 1d where it is assumed that a thin residual film of the liquid agent 3 is left behind on such impact area.

Figure 1D:
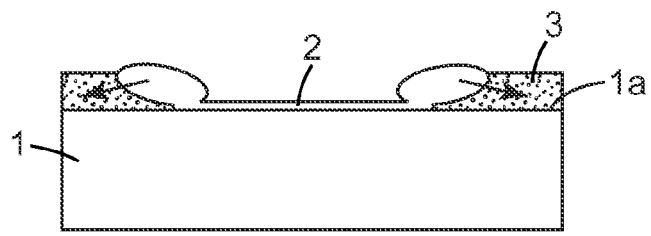

The graphical representation of FIGS. 1a-1d is highly schematic and is meant to be illustrative and by no means limiting. Although the present inventors do not wish to be bound by such theory it is speculated that the liquid activator 2 if suitable for displacing a specific hydrocarbon-containing material 3 on a metal surface 1a, will at least partially dissolve the hydrocarbon-containing material 3 when impinging or gently placed, respectively, onto the contaminated metal surface 1a, and/or it will quickly diffuse into the layer of the hydrocarbon-containing material 3. It is further assumed that this will at least partly result in locally decreasing the surface tension of the hydrocarbon-containing material thus allowing the droplet to spread (as schematically shown in FIGS. 1b and 1c) thereby pushing the hydrocarbon-containing material and the liquid activator 2 itself outward from the impact area (FIG. 1d). In case of a suitable liquid activator 2 which is capable of displacing a specific hydrocarbon-containing material 3 on a contaminated metal surface 1a, the film of the hydrocarbon-containing material 3 will at least partly rupture. The rupturing surface film carries along with it the liquid activator 2 which further propagates effect of displacing the hydrocarbon-containing material.

It was found by the present inventors that the one or more liquid compounds of the liquid activator capable of displacing hydrocarbon-containing material, preferably have a surface tension of less than 35 mN/m, more preferably of less than 33.5 mN/m and especially preferably of less than 32.5 mN/m. The liquid activator more preferably comprises one or more compounds capable of displacing hydrocarbon-containing material that are liquid at room temperature and have a surface tension of between 18 and 35 mN/m, more preferably of between 19.5 and 33.5 mN/m and especially preferably of between 20.0 and 32.5 mN/m. The surface tension of the liquid activator and the components comprised therein is measured via the so-called pendant drop method (also referred to as pendant drop shape analysis method) as specified, for example, in "Surface tension: Pendant Drop Shape Analysis", F. K. Hansen, G. Rodsrun, J. Coll.&Inter. Sci., 141 (1991), 1-12.

Independently of the above, the one or more compounds of the liquid activator capable of displacing hydrocarbon-containing material, preferably exhibit a solubility parameter of less than 10 $cal^{0.5}$ $cm^{-3/2}$. Solubility parameters are preferably calculated with the Molecular Modeling Pro software available from ChemSW, Inc., Fairfield, Calif., U.S.A. using the method disclosed in van Krevelen, D. W., "Properties of Polymers: Their Correlation with Chemical Structure: Their Numerical Estimation and Prediction from Additive Group Contributions, $4^{th}$ Ed., 1990, Elsevier: Amsterdam, The Netherlands, pp. 200-225. Preferably, the one or more compounds capable of displacing hydrocarbon-containing material, have a solubility parameter of between 7.0 and 11 $cal^{0.5}$ $cm^{-3/2}$, more preferably of between 7.2 and 10.8 $cal^{0.5}$ $cm^{-3/2}$ and especially preferably of between 7.5 and 10.0 $cal^{0.5}$ $cm^{-3/2}$. If the solubility parameter of the liquid activator is lower than 7.0 $cal^{0.5}$ $cm^{-3/2}$ it might not dissolve the hydrocarbon-containing material; if the solubility parameter of the liquid activator is higher than 11.0 $cal^{0.5}$ $cm^{-3/2}$ it might not dissolve the hydrocarbon-containing material, as well.

More specifically, the one or more compounds of the liquid activator capable of displacing hydrocarbon-containing material, preferably exhibit a solubility parameter of less than 10 $cal^{0.5}$ $cm^{-3/2}$ and a surface tension as measured by the pendant drop method of less than 35 mN/m. More preferably, such compounds exhibit a solubility parameter of between 7 and 11 $cal^{0.5}$ $cm^{-3/2}$, more preferably of between 7.25 and 10.75 $cal^{0.5}$ $cm^{-3/2}$ and especially preferably of between 7.5 and 10.5 $cal^{0.5}$ $cm^{-3/2}$ and a surface tension as measured by the pendant drop method of between 18 and 35 mN/m, more preferably of between 19.5 and 34 mN/m and especially preferably of between 20.0 and 33.5 mN/m.

It was furthermore found by the present inventors that the liquid activator preferably comprises one or more compounds capable of displacing hydrocarbon-containing material, which are selected with respect to a specific contaminated metal surface so that the activator has a surface tension which is lower than the surface tension of the hydrocarbon containing material. The surface tension of hydrocarbon-containing material which is liquid at room temperature such as mineral oil or the like can be determined by the pendant drop method referred to above. The surface tension of hydrocarbon-containing material which is solid at room temperature such as dry lube or the like can be determined according to ASTM C813-90 (1994) e1 via the contact angle method.

The present inventors found that for a specific hydrocarbon-containing material, the liquid activator is preferably selected so that the surface tension of the hydrocarbon-containing material on the metal surface exceeds the surface tension of the liquid activator by at least 2.5 mN/m, more preferably by at least 3.5 mN/m and especially preferably by 4.0 mN/m.

Independently of the above, compounds which are capable of displacing a specific hydrocarbon-containing material on a metal surface can be selected by applying the Test for Determining Displacement of Hydrocarbon-Containing Material which is described in the test section below. A droplet of a specific volume of the compound to be tested is gently deposited on the respective surface contaminated with a hydrocarbon-containing material under consideration. The effect of the droplet on the hydrocarbon-containing material on the metal surface is observed with the naked eye. Liquid activator compounds capable of displacing hydrocarbon-containing material, tend to spread out fast, forming a "wave" at the perimeter of the spreading and thinning out in the center of the droplet. When viewing from top onto a quickly spreading droplet it does often not have an essentially circular shape but rather exhibits some fingering at the perimeter. The present inventors found that compounds which are suitable as liquid activator compounds in the present invention, preferably tend to spread when evaluated in such Test for Determining Displacement of Hydrocarbon-Containing Material, to a spot with an extension of 20 mm in less than 75 s, more preferably in not more than 60 s, even more preferably in not more than 40 s and especially preferably in not more than 20 s. Such compounds are also referred to above and below as compounds that pass the Test for Determining Displacement of Hydrocarbon-Containing Material relative to a specific contaminated surface. Contrary to this, compounds which are not suitable as liquid activator compounds form a thick lens which does not spread or which spreads much slower and/or to a much lesser extent when evaluated in such Test for Determining Displacement of Hydrocarbon-Containing Material.

The present inventors have developed the above criteria to select compounds which are useful for displacing hydrocarbon-containing material on a metal surface in accordance with the present invention. Based on these criteria, the person skilled in the art can easily and without undue experimental effort determine and optimize suitable liquid activators.

Generally, useful liquid activator compounds may be selected from classes of compounds comprising aliphatic and aromatic hydrocarbons, alkyl esters, alkyl ethers, aryl esters, aryl ethers, alkyl alcohols, glycols and glycol ethers. Particularly useful liquid activator compounds may be selected from a group of compounds comprising n-alcohols with the number of carbons ranging from 7 to 11, fatty acid esters, n-alkanes with the number of carbons ranging from 6 to 16, terpenes such as limonene, α-pinene, i-pinene, terpene oxides such as 1,8-cineole, limonene oxide, α-pinene oxide but excluding β-pinene oxide, glycidyl ethers with a branched or unbranched carbon chain with 1 to 10 carbons such as 2-ethyhexyl glycidyl ether. Compounds which are capable of displacing hydrocarbon-containing material are selected from these broader classes by applying the guidelines described above based on the measurement of surface tension, the calculation of solubility parameter and/or performing of the Test for Determining Displacement of Hydrocarbon-Containing Material.

It was specifically found that liquid activator components which are useful in the present invention comprise one or more liquid oil-displacing agents which are selected from a group comprising n-heptane, n-decane, n-dodecane, limonene, α-pinene, β-pinene, 1,8-cineole, limonene oxide, α-pinene oxide, 1-octanol, n-decanol, 2-ethylhexyl glycidyl ether, butyl lactate, isopropyl myristate, methyl oleate, dibutyl maleate, dibutyl adipate, 1,2,3,4 tetra hydro naphthalene and 3M Citrus Base Cleaner (commercially available from 3M Deutschland GmbH, Neuss, Germany Although the present inventors do not wish to be bound by such explanation in any way it is further speculated that the observed displacement phenomenon of hydrocarbon-containing material may be further theoretically described in terms of the so-called Marangoni effect which is described, for example, in Marangoni, C., "Über die Ausbreitung der Tropfen einer Flüssigkeit auf der Oberfläche einer anderen", Ann. Phys., 143 (1871), 337; Davis, S. H., "Thermocapillary Instabilities", Ann. Rev. Fluid Mech., 14 (1987), 403 and Fanton, X., Cazabat, A. M., "Spreading and Instabilities Induced by a Solutal Marangoni Effect", Langmuir, 14 (1998), 2554.

The liquid activator component preferably comprises 1-4 and more preferably 1-3 compounds which are liquid at room temperature and capable of displacing hydrocarbon-containing material. The liquid activator component may comprise other compounds such as, for example, corrosion inhibitors, UV fluorescent additives and adhesion promoters. The amount of the one or more compounds capable of displacing hydrocarbon-containing material, preferably is at least 90.0 wt. % and more preferably at least 95.0 wt. % with respect to the mass of the liquid activator.

Corrosion inhibitors are chemical compounds that, when added to e.g. fluids, decrease the corrosion rate of a metal or an alloy when exposed to such fluids. Examples of corrosion inhibitors useful in the present invention include silica gels including Ca-Ion exchanged silica gels such as SHIELDEX AC5 (Grace Davison, Columbia, Md./U.S.A), a synthetic amorphous silica, calcium hydroxide mixture, or corrosion inhibitors such as Ciba Sarkosyl O (available from CIBA, GmbH, Germany), a N-acyl sarcosine.

UV fluorescent additives which are suitable in the present invention absorb light in the UV spectrum and emit light in the blue region of the visible spectrum. Such compounds which are also known as optical brighteners are commercially available, for example, as Uvitex OB and Uvitex OB-One (CIBA) or Hostalux (Clariant), Hostalux KS, Hostalux KS1 and Hostalux KSB.

Adhesion promoters are applied to a substrate to enhance the bond strength between a surface coating and the substrate. Examples of adhesion promoters suitable in the present invention include silanes such as SILANE Z-6040 (Dow-Corning, Seneffe, Belgium), a γ-glycidoxypropyl-trimethoxysilane. Further adhesion promoters useful herein are phosphorus-containing compounds with mono-esters of phosphinic, mono-and diesters of phosphonic and phosphoric acids having one unit of vinyl or allylic unsaturation present. A preferred adhesion promoter of this group is 2-Hydroxyethyl Methacrylate phosphate (HEMA phosphate).

The liquid activator component may comprise one or more additives selected from the group of corrosion inhibitors, UV fluorescent additives and adhesion promoters. In case the liquid activator component comprises one or more of these additives these are preferably present in an amount of between 0.01 and 10 wt %, more preferably between 0.01-8 wt % and more preferably 0.1-5 wt %.

The liquid activator is directly applied onto the metal surface comprising a surface contamination of hydrocarbon-containing material. The liquid activator can preferably be applied to the contaminated surface by using various techniques such as spraying, screen-printing, tampon-printing, ink jet printing or curtain-coating. Especially preferred are contact-less application techniques such as spraying, ink jet printing or curtain-coating.

The liquid activator is applied in an amount sufficient to displace the surface contamination of hydrocarbon-containing material from the area of the metal surface which is to be bonded to the structural adhesive described below. The required amount varies depending on the chemical composition and the amount of the hydrocarbon-containing material on the metal surface and can be determined visually by observing the displacement effect on the hydrocarbon-containing material as is described above in connection with FIGS. 1a-1d. Accordingly, the present inventors found that an amount of the liquid activator which is usually sufficient for practical requirements, has been applied if a film of hydrocarbon-containing material on the metal surface has been largely or essentially fully displaced, respectively, and/or has ruptured in the designated bonding area leaving a thin wet film on the surface behind. It was found that the thin wet film is largely comprised of the liquid activator component. It was found, for example, that for a metal surface contaminated with lubricating oils in an amount of about 2-4 $gm^{-2}$ which is a typical value in the automobile body production, a suitable liquid activator is typically applied in an amount of between 5-100 $gm^{-2}$, more preferably of 7.5-60 $gm^{-2}$ and especially preferably of 7.5-40 $gm^{-2}$. Using a liquid activator component in an amount of less than 5 $gm^{-2}$ does typically not result in a sufficient displacement of the hydrocarbon-containing material contaminating the metal surface. Applying the liquid activator component in an excess amount of more than 100 $gm^{-2}$ is mainly undesirable because of economic considerations. An adverse effect on the bonding strength of the structural adhesive to the metal surface is typically not observed because excess liquid activator is squeezed out sidewardly from the designated bonding area when applying the precursor of the structural adhesive.

The present invention is most preferably used in connection with assemblies comprising at least one substrate having a designated metal surface area to be bonded to a structural adhesive wherein said designated surface area is contaminated with a hydrocarbon-containing material. The application of a liquid activator to such a surface area effects the displacement of the hydrocarbon-containing material which results in cured assemblies with highly advantageous properties and a higher average peel force in comparison to assemblies where the contaminated surface areas had not been treated with a liquid activator. If desired the liquid activator may also be applied to non-contaminated designated surface areas or to portions of the designated surface area, respectively, which may be advantageous, for example, from a processing point of view. The application of the liquid activator to a non-contaminated surface area or portions does not adversely affect the properties of the resulting assembly. This provides a flexibility and versatility to the present invention which is highly advantageous.

The precursor of the structural adhesive of the present invention comprises a cross-linkable polymer and, in case it is cured by heat and/or actinic radiation, an effective amount of a curing component.

The cross-linkable component may comprise one or more polymers which are selected from a group consisting of epoxy resins, phenolic resins, melamine resins and aminoplast resins, cyanate resins, alkyd resins, allyl resins, silicones, acrylic resins or polyurethane resins.

The cross-linkable polymer component is preferably based on one or more epoxy resins. The term "epoxy resin" is used herein to mean any of monomeric, dimeric, oligomeric or polymeric epoxy materials containing at least more than one and more preferably at least 2 epoxy functional groups per molecule. Such compounds include monomeric epoxy compounds and epoxides of the polymeric type and can be aliphatic, cycloaliphatic, aromatic or heterocyclic. Monomeric and oligomeric epoxy compounds preferably have more than one and preferably one to four polymerizable epoxy groups per molecule. In polymeric type epoxides or epoxy resins, there may be many pendent epoxy groups (e.g., a glycidyl methacrylate polymer could have several thousand pendent epoxy groups per average molecular weight). Oligomeric epoxides and, in particular, polymeric epoxy resins are preferred.

The molecular weight of the epoxy-containing materials may vary from low molecular weight monomeric or oligomeric materials with a molecular weight, e.g., from about 100 to polymeric resins with a molecular weight of about 50,000 or more and may vary greatly in the nature of their backbone and substituent groups. For example, the backbone may be of any type, and substituent groups thereon can be any group not having a nucleophilic group or electrophilic group (such as an active hydrogen atom) which is reactive with an oxirane ring. Illustrative of permissible substituent groups are halogens, ester groups, ethers, sulfonate groups, siloxane groups, nitro groups, amide groups, nitrile groups, phosphate groups, etc. Mixtures of various epoxy-containing compounds can also be used in the epoxy component. The epoxy component preferably comprises a mixture of two or more epoxy resins in order to modify and adapt the mechanical properties of the cross-linked structural adhesive with respect to specific requirements.

Types of epoxy resins that can be used include, for example, the reaction product of bisphenol A and epichlorohydrin, the reaction product of phenol and formaldehyde (novolac resin) and epichlorohydrin, peracid epoxies, glycidyl esters, glycidyl ethers, the reaction product of epichlorohydrin and p-amino phenol, the reaction product of epichlorohydrin and glyoxal tetraphenol and the like.

Epoxides that are particularly useful in the precursors of structural adhesives of the present invention include glycidyl ether epoxides of the following general formula

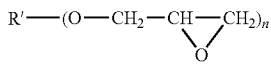

wherein
R' is alkyl, alkyl ether, or aryl;
n is greater than 1 and, in particular, in the range from 1 to 4.

Preferred glycidyl ether epoxides of formula (I) include glycidyl ethers of Bisphenol A and F, aliphatic or cycloaliphatic diols. The glycidyl ether epoxides of formula (I) preferably have a molecular weight in the range of from about 170 to about 10,000, preferably from about 200 to about 3,000 g/mol.

Useful glycidyl ether epoxides of formula (I) include linear polymeric epoxides having terminal epoxy groups (e.g., a diglycidyl ether of polyoxyalkylene glycol). Furthermore preferred are aromatic glycidyl ethers, such as those prepared by reacting a dihydric phenol with an excess of epichlorohydrin. Examples of useful dihydric phenols include resorcinol, catechol, hydroquinone, and the polynuclear phenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Examples of commercially available aromatic and aliphatic epoxies useful in the precursor of the structural adhesive of the invention include diglycidylether of bisphenol A (e.g. available under the tradename EPON 828, EPON 1001, EPON 1310 and EPON 1510 from Hexion Speciality Chemicals GmbH, Rosbach, Germany), DER-331, DER-332, and DER-334 available from Dow Chemical Co,); diglycidyl ether of bisphenol F (e.g. EPICLON 830) available from Dainippon Ink and Chemicals, Inc.); silicone resins containing diglycidyl epoxy functionality; flame retardant epoxy resins (e.g. DER 580, a brominated bisphenol type epoxy resin available from Dow Chemical Co.); 1,4-dimethanol cyclohexyl diglycidyl ether and 1,4-butanediol diglycidyl ether. Other epoxy resins based on bisphenols are commercially available under the tradenames D.E.N., EPALLOY and EPILOX.

Structural epoxy based adhesives useful in the present invention are furthermore disclosed in U.S. Pat. No. 6,486,256 and WO 94/00,527.

Heat-activatable curing compounds suitable for curing epoxides include polycarboxylic acid anhydrides, dicyandiamide, primary or secondary amines, complexes of amines, such as ethylamine and trimethylamine with boron trifluoride or boron trichloride, aromatic polyamines such as bis(p-aminophenyl)methane, and imidazoles such as 2-ethyl-4-methylimidazole and 2-phenylimidazole.

Preferred heat-activatable curing agents suitable for curing epoxy resins include primary or secondary amines with primary amines being preferred. The amines may be aliphatic, cycloaliphatic, aromatic, or aromatic structures having one or more amino moiety. Examples for suitable heat-activatable amine curing agents include ethylenediamine, diethylenediamine, triethylentetramine, propylenediamine, tetraethylenepentamine, hexaethyleneheptamine, hexamethylenediamine, 2-methyl-1,5-pentamethylene-diamine, and the like. Preferably, the curing agent is a polyetheramine having one or more amine moiety, including those polyetheramines that can be derived from polypropyleneoxide or polyethylenoxide.

It is also possible to use a latent heat-activatable curing component. The term "latent" means that the curing component is essentially unreactive at room temperature but rapidly reacts to effect curing once the onset temperature of the epoxy curing reaction has been exceeded. Latency of the hardener compounds is preferably based on solvent effects and the activity of the hardener compounds can be controlled, for example, by crystallinity, solubility or encapsulation. Crystalline hardener compounds suitable for curing epoxy resins are commercially available, for example, as Ancamine™ A 2337 X S and A 2014 G from Air Products, Manchester, U.K.

When using a heat-activatable hardener component for epoxy resins it may be advantageous to add one or more accelerators to the heat-activatable hardener component in order to crosslink the structural adhesive at lower temperatures and/or shorter times. Preferred accelerator compounds include imidazoles, imidazole-salts or imidazolines. Preferred imidazol accelerators include, for example, 2,4-diamino-6-(21-methyl-imidazoyl)-ethyl-s-triazineisocyanurate, 2-phenyl-4-benzyl-5-hydoxymethylimidazole or Ni-imidazole-phthalate.

Another class of preferred accelerators includes aromatic tertiary amines, such as for example, tris-2,4,6-(dimethylaminomethyl)phenol commercially available as ANCAMINE K54 from Air Products Chemicals Europe B.V.

Acrylic based structural adhesives typically comprise a mixture of one or more olefinic reactive monomers such as low alkyl (meth)acrylates and -(meth)acrylic acid, tougheners and a curing systems. Reactive polymers such as unsaturated polyesters or acrylourethane prepolymers or acrylated rubbers may be copolymerized with the monomers. Epoxy resins are optionally included to impart improve heat resistance. Suitable acrylic structural adhesives are disclosed, for example, in U.S. Pat. No. 6,180,199, U.S. Pat. No. 6,255,408 and U.S. 2004/229,990.

Suitable radiation-activatable curing compounds useful in acrylic based structural adhesives include those effecting cationic polymerization such as metallocene salts and aromatic onium salts. Useful metallocene salt curing compounds are described, for example, in U.S. Pat. No. 5,089,536, U.S. Pat. No. 5,059,701 and European Patent Publication No. 0,109,851. Useful commercially available cationic photoinitiators include FX-512, an aromatic sulfonium complex salt (3M Company), UVI-6974, an aromatic sulfonium complex salt (Union Carbide Corp.), and IRGACURE 261, a metallocene complex salt (Ciba Specialty Chemicals).

Suitable curing systems for acrylic structural adhesives are also disclosed in US 2004/229,990, sections [0059]-[0068] which sections are included by reference.

Cross-linkable polyurethane prepolymers can be obtained by reacting an excess of polyfunctional isocyanates with polyfunctional alcohols such as polyether or polyester polyols. In the preparation of the polyurethane prepolymers, the ratio of the hydroxyl groups of the alcohol component to the isocyanate groups of the polyfunctional isocyanates is important. A greater excess of isocyanate groups over hydroxyl groups will generally result in a reduction of viscosity as is disclosed in U.S. Pat. No. 5,128,423.

The crosslinkable polyurethane may be provided as a moisture-curable or heat-activatable one-part system. DE 29 46 085, DE 25 42 500 and DE 29 29 224 disclose heat-curable one-part polyurethane resins which are obtained by reacting free isocyanate groups with blocking agents such as, for example, phenols, caprolactames, ketoximes and malonic esters. DE 30 19 356 discloses heat-activatable polyurethane resins comprising latent hardeners such as aldimines or oxazolidines. Suitable oxazolidines are disclosed, for example, in U.S. Pat. No. 5,128,423.

The cross-linkable polyurethane resins can also be provided as two-part systems which are not hardened by means of moisture but by means of mixing them with a second component containing a hardener such as, for example, diamines, diols or amino alcohols.

If a radiation-curable curing system is used to effect crosslinking, such curing system preferably amounts to 0.001-5% by weight and more preferably between 0.1-2% by weight with respect to the total mass of the precursor of the structural adhesive. The radiation-curable curing system preferably comprises 1-3 and, more preferably, 1 radiation-curable curing compound.

If a heat-activatable curing system is used to effect crosslinking, such system preferably amounts to 2-50% by weight and more preferably between 3-45% with respect to the total mass of the precursor of the structural adhesive. The heat-activatable curing system preferably comprises 1-3 and, more preferably heat-activatable curing compounds. The precursor of the structural adhesive may further comprise adjuvants such as reactive diluents, pigments and fillers.

Reactive diluents may be added to control the flow characteristics of the precursor composition. Suitable diluents can have at least one reactive terminal end portion and, preferably, a saturated or unsaturated cyclic backbone. Preferred reactive terminal end portions include ether portions such as, particularly, glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane. Commercially available reactive diluents are for example "Reactive Diluent 107" from Hexion or Epodil 757 from Air Products and Chemical Inc, Allentown, Pa., USA.

Fillers may include adhesion promoters, corrosion inhibitors, rheology controlling agents, pigments, colorants, antioxidants, flame retardants and the like so as to reduce the weight or cost of the composition, adjust viscosity, provide additional reinforcement or to control other properties of the precursor. Fillers and the like which are capable of absorbing the radiation supplied during radiation-curing process(es) should be used in an amount that does not adversely affect the curing process. Fillers may include silica-gels, Ca-silicates, phosphates, molybdates, fumed silica, clays such as bentonite or wollastonite, organo-clays, aluminium-trihydrates, hollow-glass-microspheres; hollow-polymeric microspheres and calcium-carbonate. Commercially available fillers are, for example: SILANE Z-6040 (DOW-Corning, Seneffe, Belgium): γ-glycidoxypropyl-trimethoxysilane; SHIELDEX AC5 (Grace Davison, Columbia, Md./USA), a synthetic amorphous silica, calcium hydroxide mixture; CAB-O-SIL TS 720 (Cabot GmbH, Hanau, Germany): hydrophobic fumed silica-treated with polydimethyl-siloxane-polymer; glass-beads class IV (250-300 microns) : Micro-billes de verre 180/300 (CVP S.A., France); glass bubbles K37 (3M Deutschland GmbH, Neuss, Germany) : amorphous silica; MINSIL SF 20 (Minco Inc., 510 Midway, Tenn., USA) : amorphous, fused silica; APYRAL 24 ESF (Nabaltec GmbH, Schwandorf, Germany), epoxysilane-functionalized (2 wt %) aluminium trihydrate, TIONA 568.

The amount of such additives may be between 0-50 wt. % and more preferably 0-15 wt. % with respect to the mass of the structural adhesive. Fillers and the like which are capable of absorbing the radiation supplied during radiation-curing process(es) should be used in an amount that does not adversely affect the radiation-activated curing process if employed.

The precursor of the structural adhesive used in the present invention may be a one-part or a two-part composition. In case of two-part compositions, a first part A of the precursor comprises the cross-linkable polymer component and a separate part B of the precursor comprises the heat- or radiation-curable curing component. The precursor is prepared by mixing the two parts together.

Two part precursors, in particular those which are heat-cured, have various advantages such as for example a longer shelf-life. The mixing is preferably carried out prior to immediate use. It is possible to first mix the components together and to allow for curing at room temperature prior to heat curing.

The assembly of the present invention is obtained by treating the designated area of the metal surface of the at least one substrate to which the precursor of the structural adhesive is subsequently attached (the designated bonding area of the substrate) with a suitably selected liquid activator component. The liquid activator component can be applied to the surface by various techniques such as spraying in an amount sufficient to effect the displacement of the hydrocarbon-containing material on the metal surface as is described above.

It was found by the present inventors that the precursor of the structural adhesive can be applied to the metal surface directly after the application of the liquid activator effecting the displacement of the hydrocarbon-containing material present on the metal surface. It was found by the present inventors that it is not necessary, for example, to dry the bonding area prior to the application of the precursor of the structural adhesive.

Figure 2:
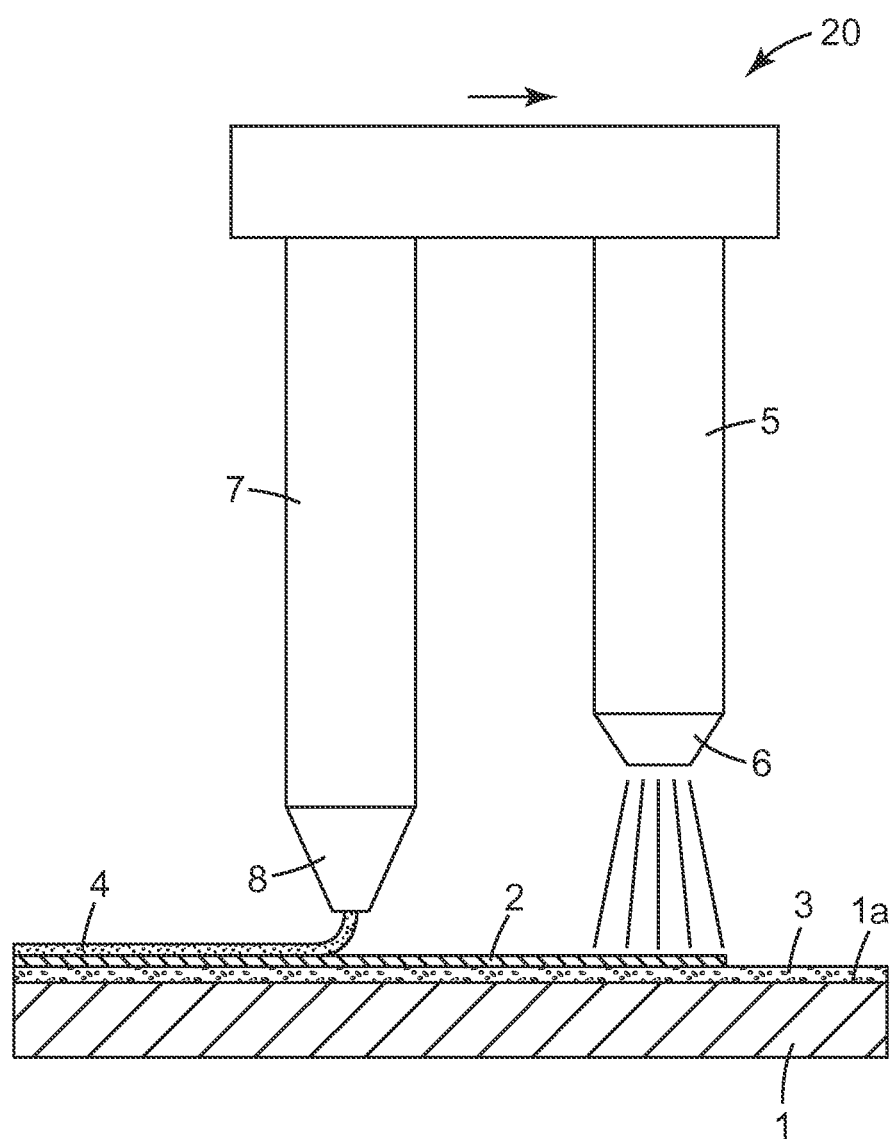
FIG. 2 shows a schematic representation of an applicator device of the present invention.
Figure 3:
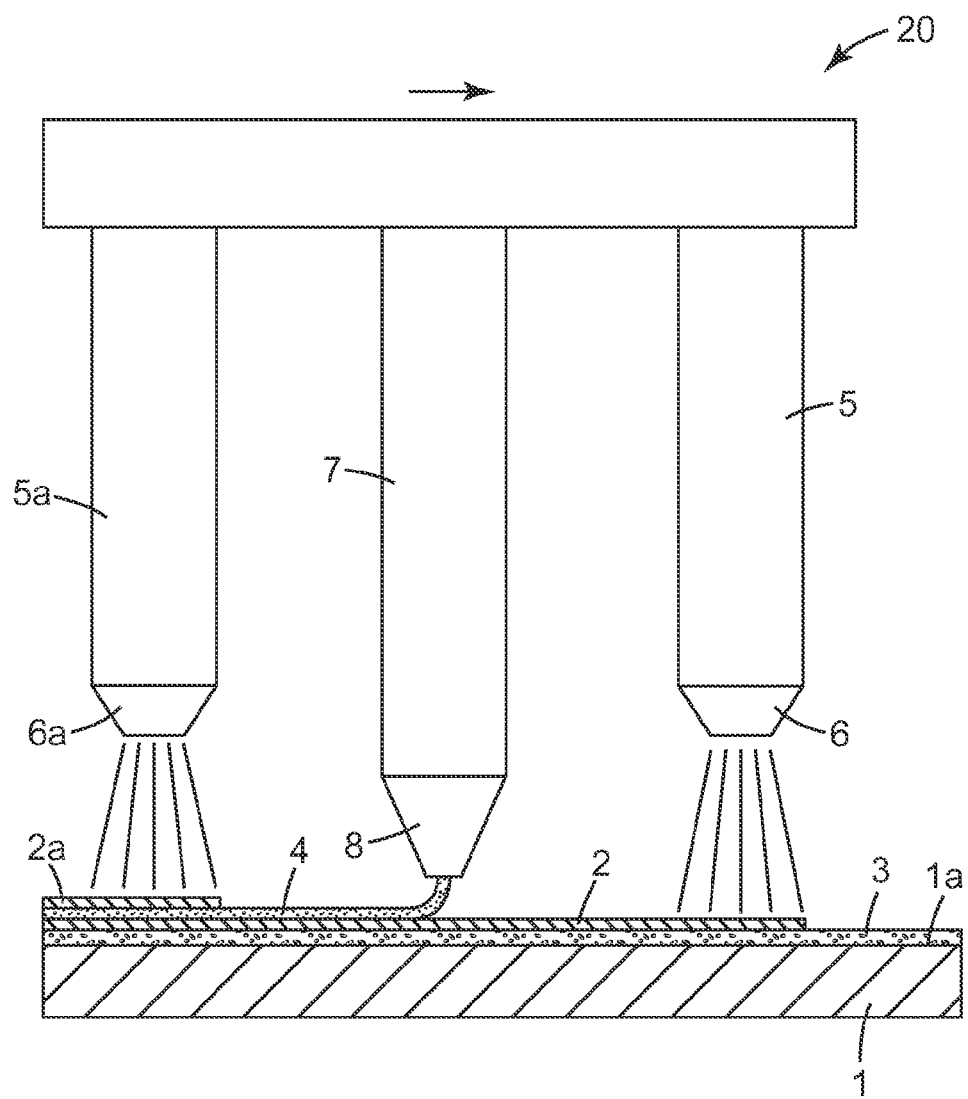
FIG. 3 shows a schematic representation of another applicator device of the present invention.

This is advantageous and allows for a simple and continuous process of manufacturing the assembly of the present invention as is schematically shown in FIGS. 2 and 3 below.

When applying the precursor of the structural adhesive to the designated bonding area treated with a liquid activator, part of the activator may be squeezed out sidewardly. Although the present inventors do not wish to be bound by such theory it is speculated that the liquid film present on the designated surface area after the treatment with the liquid activator which film is largely comprised of the liquid activator, may dissolve and/or diffuse into the precursor so that the liquid activator may be present in a higher concentration in the interfacial area between the substrate surface and the structural adhesive as compared with the bulk of the structural adhesive.

If the assembly comprises only one substrate the precursor of the structural adhesive is preferably subsequently cured, typically by the application of heat and/or actinic radiation such as UV-radiation or, in case of moisture-curable precursors, by exposure to ambient moisture. The cured structural adhesive may provide, for example, a sealant layer or a protection layer.

If the assembly comprises two substrates a second substrate is attached to the precursor of the structural adhesive to provide an adhesively bonded assembly. The second substrate may be of any type and selected, for example, from polymer, concrete, wood, glass or metal substrates whereby the term metal substrate is to be understood in a broad sense as described above. The second substrate preferably is a metal substrate and comprises a designated surface area to be bonded to the structural adhesive whereby such designated surface area or bonded area comprises one or more metals. The designated bonding area of the second substrate may be treated, if desired, with a liquid activator prior to applying it to the precursor of the adhesive as is described above.

In case the precursor of the structural adhesive is radiation-curable the curing reaction is preferably initiated by irradiating the precursor first, and the second substrate is then applied subsequently to the partially cured precursor. If one of the substrates is, e.g., glass and thus UV-transparent, the second substrate may also be assembled onto the precursor first, and curing may be effected subsequently by irradiating the assembly with UV-light through such substrate. In case of heat-activatable precursors, the second substrate is preferably applied to the precursor prior to applying heat and initiating curing of the precursor.

During and optionally also prior to the curing reaction, pressure is preferably applied to the substrates in order to ensure formation of a good bonding between the substrates and the structural adhesive. The pressure applied preferably is between 0.01 and 3 N/mm2. The curing times vary with the curing conditions and the chemical nature of the structural adhesive, and are typically between a few seconds and several days.

If desirable, further layers may be applied to the structural adhesive irrespective of whether a second substrate is attached or not.

The assemblies obtainable by a method of the present invention exhibit highly advantageous properties. This is particularly surprising in assemblies where the at least one substrate comprises a designated metal surface area to be bonded to the precursor of the structural adhesive and the cured adhesive, respectively, which is contaminated prior to bonding with a hydrocarbon-containing material.

Assemblies comprising one substrate exhibit a strong bond between the structural adhesive and the metal surface of the substrate, and they provide, for example, mechanically highly stable sealant and protection layers or coating layers which are both smooth and aesthetically appealing and scratch-resistant.

Assemblies obtained by using two substrates each comprising a designated metal surface area bonded by the precursor and the cured adhesive, respectively, preferably exhibit a high T-peel strength of more than 150 N/25 mm, preferably of more than 160 N/25 mm and most preferably of more than 180 N/25 mm. In such assemblies, the cured adhesive preferably displays a cohesive failure mechanism and a high cohesive strength indicated by overlap shear strength values of preferably at least 20 MPa.

The cured adhesives present in the assemblies of the present invention preferably have an advanced crash resistance, as measured by dynamic wedge impact (DWI) of at least 13 J, preferably at least 15 J, more preferably at least 18 J, most preferably at least 20 J.

The cured adhesives may, furthermore, have good or improved ageing resistance.

Assemblies with such highly advantageous properties were not available in the prior art when using at least one substrate having a designated metal surface area to be bonded to the precursor of the structural adhesive and the cured adhesive, respectively, where such designated bonding area being contaminated prior to bonding with a hydrocarbon-containing material.

The assemblies of the present invention are therefore highly desirable, for example, in the manufacture of automobile car bodies where metal substrates treated with hydrocarbon-containing material such as lubricating agents, high performance mineral oils, deep drawing agents and the like need to be bonded.

The assemblies of the present invention can advantageously be made by using the applicator device 20 of FIG. 2 which comprises a first application unit 5 for applying continuously or discontinuously the liquid activator and a second application unit 7 for applying continuously or discontinuously the precursor 4 of the structural adhesive to the metal surface 1a of the substrate 1. The applicator device 20 is moveable into the direction of the arrow relative to the metal surface 1a of the substrate 1. The metal surface 1a is contaminated with a layer of a hydrocarbon-containing material 3. The second application unit 7 is arranged, relative to the direction of movement of the applicator device 20, behind the first application unit 5 so that the liquid activator component 2 is sprayed through nozzle 6 onto the layer of the hydrocarbon-containing material 3 before the precursor 4 of the structural adhesive is applied via the extrusion die 8. Thus, the hydrocarbon-containing material is first displaced from the bonding area by virtue of the mechanism schematically shown in FIGS. 1a-1d above. Then, the precursor 4 of the structural adhesive is applied to the treated wet bonding area of the metal surface 1a which is typically covered with a thin film largely comprised of the liquid activator component 2.

The applicator device 20 of FIG. 2 may comprise, if desired, further application units which apply one or more further layers onto the precursor 4 of the structural adhesive. The applicator device 20 of FIG. 3 comprises a further application unit 5a which is arranged is arranged, relative to the direction of movement of the applicator device 20, behind the second application unit 7 so that the liquid activator 2a is sprayed through nozzle 6a onto the layer of the precursor of the structural adhesive. It was found that the second substrate which may, in particular, be contaminated with hydrocarbon-containing material 3 can be directly attached to the exposed surface of liquid activator 2a without any further prior treatment of the bonding surface of the second substrate being required. It was found that the resulting assembly obtained upon curing which comprises two substrates sandwiching the structural adhesives, exhibits highly advantageous properties and, in particular, a high average peel force. The applicator of FIG. 3 can advantageously be incorporated into automate industrial manufacturing processes as used, for example, in the manufacture of automobile bodies.

Another embodiment of an applicator useful in the present invention may comprise a curing unit arranged, relative to the direction of movement of the applicator device 20, behind the second adhesive applicator unit 7 to effect immediate curing of the precursor 4; in case of a radiation curable precursor 4 such additional curing unit preferably comprises, for example, an irradiation unit. Such arrangement is particularly useful for manufacturing assemblies comprising only one substrate.

The processes shown in FIGS. 2 and 3 are merely illustrative and by no means limiting. The application units 5, 5a, 7 providing the liquid activators 2, 2a and the precursor 4 of the structural adhesive can be, for example, via separate, unconnected units.

The following examples and data further illustrate the invention but are not meant to limit the invention in any form. Above and below, the term "liquid" means liquid at room temperature (20° C.) unless indicated otherwise.

EXAMPLES

Materials Employed:
A. Hydrocarbon-Containing Material (Oil)

| Abbreviation | Product (trade designation provided in capital letters)[1] | Surface tension (mN/m) | Availability |
|---|---|---|---|
| Oil 1 | MULTIDRAW ® KTL N16 - Deep drawing oil | 38.2 | Zeller + Gmelin, Eislingen, Germany |
| Oil 2 | RENOFORM MCO 3028 - Deep drawing oil | | Fuchs Europe Schmierstoffe GmbH, Mannheim, Germany |
| Oil 3 | ANTICORIT PL 39 LV 8 - Prelube deep drawing oil with corrosion protection | | Fuchs Europe Schmierstoffe GmbH, Mannheim, Germany |
| Oil 4 | ANTICORIT PL 3802-39S - Low-viscosity, barium-free corrosion prevention oil | | Fuchs Europe Schmierstoffe GmbH, Mannheim, Germany |
| Oil 5 | PRETON R-303 PX2 - Rust prevention oil | | Sugimura Chemical Industrial, Japan; available from ML Lubrication GmbH, Schweinfurt, Germany |
| Oil 6 | Platinol B804/3COW-1 - Deep drawing oil | 38.3 | OEST GmbH&Co KG, Freudenstadt, Germany |
| Oil 7 | Multidraw Drylube E1 - Waterless, semi-dry lubricant, solid at room temperature, liquid at 50° C. | | Zeller + Gmelin, Eislingen, Germany |

Note:
[1])Surface tension measured according to the Pendant Drop Shape Analysis method (as described, for example, by F.K. Hansen, G. Rodsrun, J. Coll.& Inter. Science 141 (1991), 1-12 using measurement device F1 Series Goniometer with DROPimage Advanced v2.2, available from Rame-Hart Instrument Co., Netcong, NJ USA B. Liquid Activator (Act)

| Abbreviation | Product (trade name in capital letters) | Surface Tension (mN/m) (literature)[2] | Solubility Parameter (cal$^{0.5}$/cm$^{3/2}$) | Spread time[3] (in sec) |
|---|---|---|---|---|
| Act 1 | 3M CITRUS BASE CLEANER - limonene containing cleaner (3M, Neuss, Germany) | 27.9 | 9.0 | 9 |
| Act 2 | (R+)Limonene | 26.9 | 8.02 | 7.1 |
| Act 3 | 1-Octanol | 25.1 | 9.66 | 19 |
| Act 4 | Butyl lactate | 30.0 | 9.7 | 30.5 |
| Act 5 | n-decane | 22.7 | 8.2 | 4.3 |
| Act 6 | OEST 1 (OEST GmbH&Co KG, Freudenstadt, Germany) | 39.0 | | 240 |
| Act 7 | FERROCOTE ® FCT 6130 (Quaker, available from EMKA Schmiertechnik GmbH, Bretzfeld-Schwabbach, Germany | 39.5 | | 500 |

| Abbreviation | Product (trade name in capital letters) | Surface Tension (mN/m) (literature)[2] | Solubility Parameter (cal$^{0.5}$/cm$^{3/2}$) | Spread time[3] (in sec) |
|---|---|---|---|---|
| Act 8 | Di-ethyleneglycol-monobutylether | 32.3 | 10.2 | 62 |
| Act 9 | Di-ethyleneglycol-monobutylether/water 80/20 | 30.1 | 13 | 240 |
| Act 10 | n-dodecane | 25.3 | 8.50 | |
| Act 11 | n-decanol | 28.5 | 10.20 | |
| Act 12 | Isopropyl myristate | 27.8 | 8.02 | |
| Act 13 | Dibutyl maleate | 27.0 | 9.08 | |
| Act 14 | Dibutyl adipate | 27.5 | 9.40 | |
| Act 15 | Methyl oleate | 29.0 | 8.19 | |
| Act 16 | 1,2,3,4 tetra hydro naphthalene ("Tetralin") | 35.8 | | 9.5 |

Note:
[2] Surface tension measured according to the Pendant Drop Shape Analysis method (as described, for example, by F.K. Hansen, G. Rodsrun, J. Coll.& Inter. Science 141 (1991), 1-12 using measurement device F1 Series Goniometer with DROPimage Advanced v2.2, available from Rame-Hart Instrument Co., Netcong, NJ USA
[3] Spread time measured on St-2 panel contaminated with Oil 6 at a surface concentration of 3 gm$^{-2}$ according to the test method described above

C. Additives

| Abbreviation | Product (trade name in capital letters) |
|---|---|
| Add 1 | CIBA Sarkosyl O, Corrosion Inhibitor (commercially available from Ciba GmbH, Germany) |
| Add 2 | UV fluorescent CIBA Uvitex OB (commercially available from Ciba Speciality Chemical, Mississauga, Ontario, Canada) |

D. Precursor of Structural Adhesives (Adh)

Preparation of the Precursor of Structural Adhesive 1 (Adh 1): 2 part epoxy adhesive Adhesive 1 was made by mixing together part A and part B in a ¼ ratio, using the ingredients as is given in table 1. Mixing was done using a DAC 150 FVZ Speed mixer (Hauschild Engineering, Germany) at 3000 rpm for 1 min.

Preparation of Part A:

TDD (Amine curative) was heated to 80° C. Small portions of Epikote 828 were added such that the temperature did not rise above 100° C. Ancamine K54 was added and the mixture was stirred for further 5 minutes. The filler (eg Apyral 24ESF) was added at 23° C. while stirring for 1 minute using a high speed mixer (DAC 150 FVZ Speedmixer, Hauschild Engineering, Germany) at 3000 rpm.

Preparation of Part B

Epoxy resin (Epon 828) and reactive diluent Epodil 757 were mixed at 23° C. with stirring. The core-shell polymer Paraloid EXL 2600 was added in small portions with stirring for 15 minutes. After an additional stirring for 30 minutes, the mixture was heated to 80° C. and held for 90 minutes. The solution was cooled down to room temperature. The acetoacetoxy polymer K-Flex MX B301 and fillers (e.g. Shieldex AC45) were subsequently added and homogenized with a high speed mixer (a DAC 150 FVZ Speedmixer, Hauschild Engineering, stirring at 3000 rpm for 1 minute after each addition at 23° C.).

TABLE 1

Composition of the precursor of structural adhesive 1

| Material | Kind and Availability | Weight % |
|---|---|---|
| Part B | | |
| Epon 828 | Epoxy resin based on diglycidylether of bisphenol-A, MW < 700 g/mol (Hexion Speciality Chemicals GmbH, Rosbach, Germany). | 43.16 |
| Epodil 757 | 1,4-Cyclohexandimethanoldiglycidylether (Air Products and Chemicals Inc., Allentown, PA/USA). | 11.40 |
| Paraloid EXL 2600 | Methacrylate/butadiene/styrene polymer with core/shell architecture (Rohm and Haas Company, Philadelphia, PA/USA). | 24.43 |
| K-Flex | Acetoacetoxy functionalized polyester polyol (Worlee-Chemie GmbH, Lauenburg, Germany). | 5.70 |
| Filler and additives | 1.63% Silane Z6040 (Dow Corning); 3.26% Shieldex AC5 (Grace); 5.70% Apyral 24 (Nabaltec AG); 3.26% Cab-O-Sil TS 720 (Cabot Corporation); 1.22% Glass bubbles, class IV and 0.24% Carbon Black M 120. | 15.31 |
| Total | | 100 |

TABLE 1-continued

Composition of the precursor of structural adhesive 1

| Material | Kind and Availability | Weight % |
|---|---|---|
| Part A | | |
| TTD | 4,7,10-Trioxa-1,13-tridecane-diamine (BASF, Ludwigshafen, Germany) | 43.25 |
| Epikote 828 | Epoxy resin based on diglycidylether of bisphenol-A, MW < 700 g/mol (Hexion Speciality Chemicals GmbH, Rosbach, Germany). | 25.32 |
| Ancamine K54 | Tris-2,4,6-dimethylaminomethyl-phenol (Air Products and Chemicals, Inc., Allentown/PA/USA) | 7.91 |
| Calciumnitrate-tetrahydrate | (VWR International GmbH, Darmstadt, Germany) | 7.38 |
| Filler | 1.05% Cab-O-Sil TS720 (Cabot Corporation); 14.77 Apyral 24 (Nabaltec AG); 0.32% blue pigment | 16.14 |
| Total | | 100 |

Precursor of Structural Adhesive 2 (Adh 2): two-component polyurethane adhesive, commercially available from 3M, (Neuss, Germany) under the trade designation SCOTCH-WELD™ DP 609

Precursor of Structural Adhesive 3 (Adh 3): 1 part epoxy structural adhesive, commercially available from Dow (Germany), under the trade designation DOW BETAMATE 1025V E. Substrates and Assemblies 1. Substrates (Also Referred to as Panels)

The following substrates were used as test panels:

Steel panels (St-1): zinc-plated steel panels (DC 04 ZE 50/50), available from Thyssen Krupp, Germany), thickness 0.9 mm Steel panels (St-2): zinc-plated, phosphated steel panels (DC 04 ZEP 75/75, available from Thyssen Krupp, Germany), thickness 0.8 mm Aluminium panels (Al-1): aluminium with TiZr surface layer (AC 170 TiZr, available from Alcan), thickness 1.1 mm Aluminium panels (Al-2): aluminium AA 6010-Alodine 2010, having a thickness of 1 mm and coated with Multidraw Dry Lube E1 (available from Zeller+Gmelin) at a concentration of 1.5 g/m$^2$ Aluminium panels (Al-3): aluminium having a thickness of 1.5 mm and coated with Dry Lube Houghto Draw DF 521/AWF at a concentration of 1 g/m$^2$ (available from Hydro Aluminium GmbH, Germany)

Aluminium panels (Al-4): aluminium), having a thickness of 1.5 mm and coated with Dry Lube Anticorit PL 3802-39SX at a concentration of 1 g/m$^2$ (available from Hydro Aluminium GmbH, Germany)

Aluminium panels (Al-5): aluminium having a thickness of 1.5 mm and coated with Dry Lube Quaker EU-SSB 00287 at a concentration of 1 g/m$^2$ (available from Hydro Aluminium GmbH, Germany)

Aluminium panels (Al-6): aluminium having a thickness of 1.5 mm and coated with Dry Lube Raziol Drylube WA03T at a concentration of 1 g/m$^2$ (available from Hydro Aluminium GmbH, Germany)

2. Application of a Hydrocarbon-Containing Material to the Substrates (Panels)

150 mm×25 mm substrates as mentioned above were cleaned by immersion in 1:1 n-heptane and methyl-ethylketone for at least one hour with gently shaking every 10 minutes (except for Al-2 to Al-6 which were used as received). Subsequently, the substrates were wiped with a tissue saturated with n-heptane and dried.

10 µl of a hydrocarbon-containing material as given in the respective examples was applied by a micro pipette to the cleaned substrates and distributed to cover a designated surface area of 25 mm×100 mm. This procedure provided a contamination of the panel substrates with about 3 g/m$^2$ to 3.6 g/m$^2$ hydrocarbon-containing material. The panels were stored at room temperature for at least 15 hours before further use.

3. Preparation of Assembly Comprising Two Substrates Bonded with a Cured Structural Adhesive The liquid activator was sprayed onto the contaminated panels, as prepared above or as received (Al-2 to Al-6), using a spray equipment (commercially available from EFD Inc. East Providence U.S.A. as ValveMate 7040, S.No. 637407 with Spray Nozzle 7815) with a fixed spray nozzle and a conveyor belt moving under the nozzle with a speed of 200 mm/s. The distance between nozzle and substrate was 54 mm, the diameter of the spray pattern was 12.5 mm. The spraying nozzle was adjusted so as to give a concentration of liquid activator on the contaminated panels of about 0.3 g/m (corresponding to 12 g/m$^2$) or 0.5 g/m (20 g/m$^2$) unless otherwise indicated.

After the application of liquid activator to two panels being contaminated with the same hydrocarbon-containing material, the precursor of the structural adhesive (as identified in the respective example) was applied to one of the panels by using the original ScotchWeld cartridges with static mixer nozzle and the two panels were joined which are commercially available from 3M (as part of an adhesive system available from 3M Deutschland GmbH as ScotchWeld™ DP-609) or from MixPac Systems AG, Rotkreuz, Switzerland. The time between applying the liquid activator and forming the assembly of the two panels was in general between 40 to 60 seconds. After joining, the assembly was held together with 6 spring clips to prevent movement during curing.

Assemblies comprising two steel panels (St-1) were cured at room temperature for 24 hours, followed by curing at 175° C. during 30 minutes, unless otherwise indicated.

Assemblies comprising two aluminium panels Al-1 were cured at room temperature for 24 hours, followed by curing at 120° C. during 12 minutes, curing at room temperature for 30 minutes and finally curing at 175° C. for 15 min, unless otherwise indicated.

Assemblies comprising two aluminium panels Al-2 were cured at room temperature for 24 hours, followed by curing at 175° C. during 30 minutes.

Assemblies comprising two aluminium panels each of either Al-3 to Al-6 were cured at room temperature for 24 hours, followed by curing at 180° C. during 25 minutes.

After curing, the assemblies were stored at room temperature for at least 1 hour before being subjected to the T-peel test.

F. Test Methods

1. Test for the Displacement of Hydrocarbon-Containing Material

In order to determine the efficiency of a liquid activator to displace hydrocarbon-containing material from a substrate, a 20 μl droplet of the liquid activator was placed with an Eppendorf pipette directly on a metal substrate being contaminated with the respective hydrocarbon-containing material at a surface concentration of 3 g/m². The substrate bearing the contamination layer is arranged horizontally on a support. When placing the droplet on the surface the pipette is gently touching the contamination layer. The test was conducted at room temperature. The time needed for the droplet of the liquid activator to spread to a spot with an extension of 20 mm was recorded (in sec).

2. T-Peel Test/Measurement of T-Peel Strength

The adhesive strength of the cured assemblies was evaluated by measuring the T-Peel strength according to DIN EN 1464, using a Zwick/Roell Z050 tensile-tester (Zwick GmbH & Co. KG, Ulm, Germany) operating at a crosshead speed of 100 mm/min. The test results are reported in N/25 mm. The failure mode is recorded as "cohesive" (cured structural adhesive is split and adhesive residues are found on both panels) or "adhesive" (cured structural adhesive is cleanly removed from one or both panels). All results are the average values of two measurements.

EXAMPLES

Examples 1 to 11, Comparative Examples C-1 to C-3 and Reference Example Ref-1

In Examples 1 to 11 assemblies bonded with a cured structural adhesive were prepared according to the general procedures given above using two steel panels (St-1), each being contaminated with Oils 1 to 6 (Examples 1-6) and Oils 1 to 5 (Examples 7-11), respectively. In Examples 1 to 6 Activator 1 was sprayed onto the panels prior to making a bond using Adhesive 1 (Adh1) at a concentration of 0.3 g/m. In Examples 7 to 11 Activator 12 was sprayed onto the panels prior to making a bond using Adhesive 1 (Adh1) at a concentration of 0.5 g/m. In reference example Ref-1, an assembly bonded with Adh 1 was made with clean steel panels. In Comparative Example C-1, the cured structural adhesive bond (Adh 1) was made between two steel panels (St-1) each being contaminated with Oil 6, without first spraying the contaminated steel panels with the liquid activator. In Comparative Examples C-2 and C-3, assemblies were made between two steel panels (St-1) each being contaminated with Oil 6, without spraying liquid activator onto such substrates prior to applying the adhesive; the precursor of the structural adhesive used in Comparative Examples C-2 and C-3, however, comprised Adhesive 1 to which Activator 1 was added in an amount of 5 or 10% by weight, respectively. After curing, the assemblies were tested in each case for their T-peel strength using the test method described above. The test results are given in table 2.

TABLE 2

| Example | Oil | Activator | Average peel force (N/25 mm) | Failure mode |
|---|---|---|---|---|
| 1 | 1 | Act 1 | 258.6 | Cohesive |
| 2 | 2 | Act 1 | 188.8 | Cohesive |
| 3 | 3 | Act 1 | 307.1 | Cohesive |
| 4 | 4 | Act 1 | 275.8 | Cohesive |
| 5 | 5 | Act 1 | 312.8 | Cohesive |
| 6 | 6 | Act 1 | 288.1 | Cohesive |
| 7 | 1 | Act 12 | 316.5 | Cohesive |
| 8 | 2 | Act 12 | 313.5 | Cohesive |
| 9 | 3 | Act 12 | 324.9 | Cohesive |
| 10 | 4 | Act 12 | 315.1 | Cohesive |
| 11 | 5 | Act 12 | 318.3 | Cohesive |
| C-1 | 6 | / | 0 | No adhesion |
| C-2 | 6 | Act 1*[4]) | 0 | No adhesion |
| C-3 | 6 | Act 1**[5]) | 25.62 | Adhesive |
| Ref-1 | / | / | 322.1 | Cohesive |

Note:
[4])Act 1*: activator 1 (5% by weight) was added to the precursor of structural adhesive 1 (Adh 1) prior to making the adhesive assembly
[5])Act 1**: activator 1 (10% by weight) was added to the precursor of structural adhesive 1 (Adh 1) prior to making the adhesive assembly Examples 12 to 21 and Reference Example Ref-2

In Examples 12 to 16, assemblies were prepared according to the general procedures given above using two Aluminium panels with TiZr surface (Al-1), each of which being contaminated with Oils 1 to 5 respectively. For Examples 12-16 Activator 1 was sprayed onto each of the panels prior to applying the precursor of the structural adhesive 1 (Adh-1) at a concentration of 0.3 g/m. In Example 17 to 21 assemblies were prepared according to the same procedures given above using two Aluminium panels each from either Al-2 to Al-6. For Examples 17 to 21 Activator 12 was sprayed onto each of the panels prior to applying the precursor of the structural adhesive 1 (Adh-1) at a concentration of 0.5 g/m. In Reference Example Ref-2, an assembly was made with clean aluminium panels Al-1. After curing, the assemblies were evaluated for their T-peel strength using the test method described above. The test results are given in table 3.

TABLE 3

| Example | Oil | Activator | Average peel force (N/25 mm) | Failure mode |
|---|---|---|---|---|
| 12 | 1 | Act 1 | 199.4 | Cohesive |
| 13 | 2 | Act 1 | 188.5 | Cohesive |
| 14 | 3 | Act 1 | 225.2 | Cohesive |
| 15 | 4 | Act 1 | 211.8 | Cohesive |
| 16 | 5 | Act 1 | 243.0 | Cohesive |
| 17 | | Act 12 | 290.8 | Cohesive |
| 18 | | Act 12 | 293.4 | Cohesive |
| 19 | | Act 12 | 288.4 | Cohesive |
| 20 | | Act 12 | 302.3 | Cohesive |
| 21 | | Act 12 | 267.6 | Cohesive |
| Ref-2 | / | / | 251.9 | Cohesive |

Examples 22 to 34, Comparative Example C-4 and Reference Example Ref-3

In examples 22 to 34, assemblies were prepared according to the general procedures given above using two Zinc-plated steel panels (St-1), each of which being contaminated with Oil 6 at a concentration of 3 g/m². Activators as given in table 4 were sprayed onto the contaminated panels prior to applying the precursor of structural adhesive 1 (Adh-1). In Reference Example Ref-3, an assembly was made with clean steel panels (St-1). In comparative example C-4, an assembly was made using two steel panels (St-1) each being contaminated with Oil 6, without spraying any activator onto the steel panels. After curing, the assemblies were evaluated for their T-peel strength using the test method described above. The test results are given in table 4.

TABLE 4

| Example | Oil | Activator | Average peel force (N/25 mm) | Failure mode |
|---|---|---|---|---|
| 22 | 6 | Act 2 | 274.3 | Cohesive |
| 23 | 6 | Act 3 | 329.9 | Cohesive |
| 24 | 6 | Act 4 | 251.1 | Cohesive |
| 25 | 6 | Act 5 | 306.6 | Cohesive |
| 26 | 6 | Act 6 | 97.9 | Cohesive/Adhesive |
| 27 | 6 | Act 7 | 128.5 | Cohesive/Adhesive |
| 28 | 6 | Act-8 | 148.3 | Cohesive/Adhesive |
| 29 | 6 | Act 9 | 142.8 | Cohesive/Adhesive |
| 30 | 6 | Act 12 | 298.03 | Cohesive |
| 31 | 6 | Act 13 | 330.1 | Cohesive |
| 32 | 6 | Act 14 | 295.4 | Cohesive |
| 33 | 6 | Act 15 | 240.5 | Cohesive |
| 34 | 6 | Act 16 | 280.9 | Cohesive |
| C-4 | 6 | / | 0 | No adhesion |
| Ref-3 | / | / | 322.1 | Cohesive |

Examples 35 to 37

In examples 35 to 37 assemblies were prepared according to the general procedures given above using two Zinc-plated, phosphated steel panels (St-2), each of which being contaminated with Oil 6 at a concentration of 3.0 g/m². Activators as given in table 5 were sprayed onto the contaminated panels prior to applying the precursor of structural adhesive 1 (Adh-1). In Reference Example Ref-4, an assembly was made with clean Zinc-plated, phosphated steel panels (St-2). After curing, the assemblies were evaluated for their T-peel strength using the test method described previously. The test results are given in table 5.

TABLE 5

| Example | Oil | Activator | Average peel force (N/25 mm) | Failure mode |
|---|---|---|---|---|
| 35 | 6 | Act 5 | 240.9 | Cohesive |
| 36 | 6 | Act 10 | 229.4 | Cohesive |
| 37 | 6 | Act 11 | 199.5 | Cohesive |
| Ref-4 | / | / | 221.0 | Cohesive |

Examples 38 to 44

In Examples 38 to 44 assemblies were prepared according to the general procedures given above using two steel panels or two aluminium panels, respectively, as indicated in table 5, said panels being each contaminated with Oil 6 at a concentration of 3 g/m². Different levels of Activator 3 as given in table 5 were sprayed onto the contaminated panels prior to applying the precursor of structural adhesive 1 (Adh-1). In reference examples Ref-5 and Ref-6, adhesive assemblies were made with two clean steel panels or two clean aluminium panels, respectively. After curing, the assemblies were evaluated for their T-peel strength using the test method described above. The test results are given in table 5.

TABLE 6

| Example | Panel | Amount Act-3 | Average peel force (N/25 mm) | Failure mode |
|---|---|---|---|---|
| 38 | St-1 | 8 (g/m²) | 60.4 | Adhesive/Cohesive |
| 39 | St-1 | 16 (g/m²) | 300.0 | Cohesive |
| 40 | St-1 | 24 (g/m²) | 334.0 | Cohesive |
| Ref-5 | St-1 | / | 339.6 | Cohesive |
| 41 | Al | 8 (g/m²) | 218.4 | Cohesive |
| 42 | Al | 16 (g/m²) | 223.1 | Cohesive |
| 43 | Al | 24 (g/m²) | 272.8 | Cohesive |
| 44 | Al | 40 (g/m²) | 203.8 | Cohesive |
| Ref-6 | Al | / | 258.7 | Cohesive |

Examples 45 and 46

In Examples 45 and 46 assemblies were prepared according to the general procedures given above using case two steel panels (St-1), each being contaminated with Oil 6 at a concentration of 3 g/m². Activator 1 or 3 was sprayed at a concentration of 24 g/m² prior to applying the precursor of structural adhesive 2 (Adh-2). In Comparative Example C-5, an assembly was made using two contaminated steel panels (St-1) without spraying any activator on such panels; the panels were bonded using the precursor of structural adhesive 2 (Adh-2). In Reference Example Ref-7, an assembly was made with two clean steel panels (St-1), the precursor of structural adhesive 2 (Adh-2). After curing the panels for 24 hrs at room temperature, followed by curing at 65° C. during 120 min, the T-peel strength was evaluated. The results are given in table 7

TABLE 7

| Example | Adhesive | Activator | Average peel force (N/25 mm) | Failure mode |
|---|---|---|---|---|
| 45 | Adh 2 | Act-1 | 77.4 | Adhesive |
| 46 | Adh 2 | Act-3 | 34.6 | Adhesive |
| C-5 | Adh 2 | / | 11.2 | Adhesive |
| Ref-7 | Adh 2 | / | 114.4 | Adhesive |

Examples 47 and 48

In Examples 47 and 48 assemblies were prepared according to the general procedures given above using two steel panels (St-1), each being contaminated with Oil 2 at a concentration of 3 g/m². Activators 1 or 3, respectively, were sprayed onto the designated surface areas of the steel panels at a concentration of 24 g/m² prior to applying the precursor of structural adhesive 3 (Adh-3). In Comparative Example C-6, an assembly was made using two steel panels (St-1) contaminated with Oil-2 without spraying any activator onto such panels; the panels were bonded using the precursor of structural adhesive 3 (Adh-3). After curing the panels for 24 hrs at room temperature, followed by curing at 175° C. during 120 min, the T-peel strength was evaluated. The results are given in table 8.

TABLE 8

| Example | Oil | Activator | Average peel force (N/25 mm) | Failure mode |
|---|---|---|---|---|
| 47 | Oil 2 | Act 1 | 96.0 | Cohesive |
| 48 | Oil 2 | Act 3 | 74.1 | Cohesive |
| C-6 | Oil 2 | / | 76.0 | Cohesive |

Examples 49 and 50

In Examples 49 and 50 assemblies were prepared according to the general procedures given above using in each case two Al-2 panels (each being contaminated with Oil 7 at a concentration of 1.5 g/m²). Activator 1 or 3, respectively, was sprayed onto the contaminated Al-2 panels at a concentration of 24 g/m² prior to applying the precursor of structural adhesive 1 (Adh-1). In Reference Example Ref-8 assembly (Adh 1) was made between two clean aluminium AA 6010-Alodine 2010 panels (without any contamination) using the precursor of structural adhesive 1 (Adh 1). After curing the panels for 24 hrs at room temperature, followed by curing at 175° C. during 30 min, the T-peel strength was evaluated. The results are given in table 9.

TABLE 9

| Example | Oil | Activator | Average peel force (N/25 mm) | Failure mode |
| --- | --- | --- | --- | --- |
| 49 | Oil 7 | Act 1 | 237.6 | Cohesive |
| 50 | Oil 7 | Act 3 | 253.3 | Cohesive |
| Ref-8 | / | / | 216.1 | Cohesive |

Examples 51 and 52

In Example 51 an assembly was made according to the general procedure given above using two steel panels (St-1), each being contaminated with Oil 6. Activator 1 was sprayed onto each of the contaminated panels prior to making a bond using Adhesive 1. In example 52, an assembly comprising two steel panels (St-1) each of them being contaminated with Oil 6, was made using the following procedure: in a first step, Activator 1 was sprayed onto the first contaminated steel panel, using the spray equipment as is given in the general procedure for making an adhesive assembly. The spraying nozzle was adjusted so as to give a concentration of activator liquid on the contaminated panel of about 0.3 g/m (corresponding to 12 g/m²). In a second step, the precursor of the structural adhesive 1 (Adh-1) was applied to the treated panel according to the general procedure. In a third step, another layer of activator (0.3 g/m corresponding to 12 g/m²) was sprayed onto the exposed surface of the adhesive. Finally, the second contaminated steel panel was attached. After joining, the panels were held together with 6 spring clips to prevent movement during curing. The joined steel test panels of examples 51 and 52 were cured at room temperature for 24 hours, followed by curing at 175° C. during 30 minutes. After curing, the assemblies were tested for their T-peel strength using the method described above. The test results are given in table 10.

TABLE 10

| Example | Method of making assembly | Average peel force (N/25 mm) | Failure mode |
| --- | --- | --- | --- |
| 51 | 2 panels sprayed with activator prior to making adhesive assembly | 259.3 | Cohesive |
| 52 | One panel sprayed with activator, second layer of activator sprayed on top of adhesive prior to making an adhesive assembly with a second panel | 197.2 | Cohesive |

Examples 53 to 54

In Examples 53 and 54 assemblies bonded with a cured structural adhesive were prepared according to the general procedures given previously using two steel panels (St-1), each being contaminated with Oil 6 respectively. In Example 53, 2wt % of ADD1 was added to Activator 3, and the resulting mixture was stirred for 16 hours at room temperature and then poured through filter paper. The resulting filtrate was sprayed onto the steel panels prior to applying the precursor of Adhesive 1 (Adh1). In Example 54, 0.1 wt % of ADD2 was added to Activator 3. The resulting mixture was stirred for 16 hours at room temperature and then poured through filter paper. The resulting filtrate was sprayed onto the steel panels prior to applying the precursor of Adhesive 1 (Adh1).

In reference example Ref-9 an assembly bonded with Adhesive 1 was made with clean steel panels (St-1) and the precursor of structural adhesive 1 (Adh-1). Both the assemblies of examples 53 and 54 and of reference example Ref-9 were then additionally conditioned for 14 days at 70° C. Prior to measuring the average T-peel strength as described previously, the assemblies were allowed to cool for 24 hours at room temperature.

The test results are given in table 11.

TABLE 11

| Example | Average peel force (N/25 mm) | Failure mode |
| --- | --- | --- |
| 53 | 406.1 | Cohesive |
| 54 | 323.5 | Cohesive |
| Ref-9 | 384.6 | Cohesive |

We claim:

1. A method of preparing an assembly comprising at least one substrate having an exposed surface with a designated surface area to be bonded to a structural adhesive wherein said surface area comprises at least one metal, the method comprising the steps of (i) applying a wet film of a liquid activator continuously or discontinuously to said surface area of the substrate, wherein at least 90 weight percent of the liquid activator is an oil-displacing compound comprising butyl lactate, isopropyl myristate, methyl oleate, dibutyl maleate, dibutyl adipate, terpene, terpene oxide but excluding β-pinene oxide, or glycidyl ether having a branched or unbranched carbon chain with 1 to 10 carbon atoms; and (ii) applying a precursor of the structural adhesive to the wet film directly after application of the liquid activator, wherein the precursor comprises an epoxy resin.

2. The method of preparing an assembly according to claim 1 wherein the precursor is cured.

3. The method of preparing an assembly comprising two substrates being bonded by a structural adhesive, said method comprises the steps (i) and (ii) of claim 1 and the further steps of
 (iii) optionally treating continuously or discontinuously the surface area of the second substrate to be bonded to the structural adhesive, with a liquid activator,
 (iv) attaching the second substrate to the adhesive, and
 (v) curing the precursor.

4. The method of claim 1 wherein the liquid activator is applied in an amount of between 5-100 gm$^{-2}$.

5. The method of claim 1 wherein the precursor further comprises a curing system comprising one or more curing agents selected from a group consisting of heat-activatable hardener compounds and/or radiation-activatable compounds.

6. The method of claim 1 wherein the surface of the substrate being bonded to the structural adhesive is contaminated with a hydrocarbon-containing material.

7. The method of claim 6 wherein the hydrocarbon-containing material comprises one or more compounds selected from the group consisting of mineral oils, dry lubes, deep drawing agents, corrosion protection agents, lubricating agents and grease.

8. The method of claim 1 wherein the liquid activator applied to said surface area comprises one or more compounds having a surface tension as measured according to the pendant-drop method of less than 35 mN/m.

9. The method of claim 1 wherein the liquid activator comprises one or more lipophilic compounds having a solubility parameter of between 7 and 11 $cal^{0.5}$ $cm^{-3/2}$.

10. The method of claim 6 wherein the liquid activator comprises one or more compounds that pass the Test for Determining the Displacement of Hydrocarbon-Containing Material relative to a specific contaminated surface.

11. The method of claim 6 wherein the liquid activator comprises one or more compounds which have a surface tension as measured according to the pendant drop method which is lower than the surface tension of the hydrocarbon-containing material.

12. The method of claim 11 wherein the difference between the surface tension of the surface tension of the hydrocarbon-containing material and the surface tension of the compounds of the activator is at least 2.5 mN/m.

13. The method of claim 1 wherein the liquid activator comprises one or more compounds which are selected from a group consisting of limonene, α-pinene, β-pinene, 1,8-cineole, limonene oxide, α-pinene oxide, 2-ethylhexyl glycidyl ether, butyl lactate, isopropyl myristate, methyl oleate, dibutyl maleate and dibutyl adipate.

* * * * *

UNITED STATES PATENT AND TRADEMARK OFFICE
CERTIFICATE OF CORRECTION

| | |
|---|---|
| PATENT NO. | : 8,916,020 B2 |
| APPLICATION NO. | : 12/745987 |
| DATED | : December 23, 2014 |
| INVENTOR(S) | : Jan Daniel Forster et al. |

It is certified that error appears in the above-identified patent and that said Letters Patent is hereby corrected as shown below:

In the Specification

Column 6
Lines 57-58, delete "2-ethyhexyl" and insert -- 2-ethylhexyl --, therefor.

Column 7
Line 7, delete "Germany" and insert -- Germany. --, therefor.

Columns 9-10
Line 67 [Column 9], Line 1 [Column 10], delete "dinaphrhylmethane," and insert
-- dinaphthylmethane, --, therefor.

Column 10
Line 6, delete "dihydroxydiphenylpropylenphenylmethane," and insert
-- dihydroxydiphenylpropylenephenylmethane, --, therefor.

Line 43, delete "ethylendiamine," and insert -- ethylenediamine, --, therefor.

Line 44, delete "triethylentetramine," and insert -- triethylenetetramine, --, therefor.

Lines 46-47, delete "Prefarably," and insert -- Preferably, --, therefor.

Line 49, delete "polyethylenoxide." and insert -- polyethyleneoxide. --, therefor.

Line 67, delete "imidazol" and insert -- imidazole --, therefor.

Column 11
Line 2, delete "hydoxymethylimidazole" and insert -- hydroxymethylimidazole --, therefor.

Signed and Sealed this
Eighth Day of September, 2015

Michelle K. Lee
*Director of the United States Patent and Trademark Office*

Columns 17-18 (TABLE 1)
Line 7 (Approx.), delete "Cyclohexandimethanoldiglycidylether" and insert
-- Cyclohexanedimethanoldiglycidylether --, therefor.

Column 19
Line 61, delete "Germany)" and insert -- Germany). --, therefor.

Column 24
Line 31, delete "table 7" and insert -- table 7. --, therefor.

Column 26
Line 7, delete "2wt %" and insert -- 2 wt % --, therefor.